(12) United States Patent
Gamble et al.

(10) Patent No.: US 6,259,599 B1
(45) Date of Patent: Jul. 10, 2001

(54) SHOCK ABSORBING FEET FOR A DISK DRIVE CARRIER OR OTHER COMPUTER SUB-SYSTEM HOUSING

(75) Inventors: Eric Thomas Gamble; Edward John McNulty, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/274,373

(22) Filed: Mar. 23, 1999

(51) Int. Cl.[7] .................................................. G11B 33/10
(52) U.S. Cl. .................... 361/685; 360/97.01; 312/332.1
(58) Field of Search ........................ 361/685; 360/97.01, 360/98.01, 137; 312/332.1, 333; 369/75.1

(56) References Cited

U.S. PATENT DOCUMENTS

| | | | |
|---|---|---|---|
| 5,760,998 | * 6/1998 | Berberich et al. | 361/685 |
| 5,892,747 | * 4/1999 | Okada et al. | 369/75.1 |
| 5,978,212 | * 11/1999 | Boulay et al. | 361/685 |
| 6,002,658 | * 12/1999 | Aso et al. | 369/75.1 |
| 6,108,163 | * 8/2000 | Boutaghou | 360/97.02 |

* cited by examiner

*Primary Examiner*—Leo P. Picard
*Assistant Examiner*—Hung Van Duong
(74) *Attorney, Agent, or Firm*—Martin J. McKinley

(57) ABSTRACT

A plurality of shock absorbing feet are formed by extruding a resilient material into an elongated shape having a hole that extends in the direction of elongation. Next, the elongated shape is cut into sections to form individual feet, each foot having a hole that extends from one end to the other. A plurality of tabs are attached to a disk drive or other computer sub-system carrier at one end of each tab, while the other end of each tab extends out from the carrier in a direction substantially parallel to a table or other resting surface on which the carrier can be placed. Each foot is attached to a unique one of the tabs by sliding the feet over the tabs such that the tabs are inserted into the holes in the feet.

3 Claims, 2 Drawing Sheets

SHOCK ABSORBING FEET FOR A DISK DRIVE CARRIER OR OTHER COMPUTER SUB-SYSTEM HOUSING

BACKGROUND OF THE INVENTION

This invention pertains to computer systems and other information handling systems and, more particularly, to a resilient foot that provides shock protection for a disk drive or other computer system component.

Hard disk drives are highly susceptible to shock induced damage. Damage due to shock is particularly problematic when the disk drive is removed from the computer system. For example, removing a disk drive from a "drive bay" in a computer system and placing it on a horizontal surface, such as a table, can produce a shock in excess of 150 g's with a duration of 2 to 3 ms, which can cause damage to the drive.

Obviously, the level of shock protection built into the drive's carrier, the speed at which the drive strikes the horizontal surface, and the hardness of that surface are all factors that will determine the resulting shock and damage to the drive.

The prior art solution to this problem is to use injection molded shock absorbing feet, which are attached to the underside of the drive's carrier using an adhesive. These injection molded feet will absorb some of the shock that results when the drive is placed on a hard surface. However, injection molded, shock absorbing feet are expensive and can cost in the range of $0.20 per part. Furthermore, the use of an adhesive to attach the feet to the carrier is problematic in the manufacturing process.

Accordingly, the invention described below includes an elastomeric or polymeric shock foot that is extruded, rather than injection molded. The extrusion process not only lowers the cost of each part from approximately $0.20 to only $0.01 per part, but the tooling cost (when compared to injection molding) is also reduced by 75% or more. The reduction in the piece part price is even more significant when one considers that four shock absorbing feet are typically used underneath each disk drive carrier. Furthermore, the invention uses an attaching tab that is inserted through a central hole in each foot to attach the foot to the drive carrier, thereby eliminating the adhesive problem associated with the prior art injection molded parts.

SUMMARY OF THE INVENTION

Briefly, the invention is a disk drive or other computer system suitable for placement on a resting surface, such as a table. The system includes a disk drive or other electronic component and a carrier or housing supporting the drive or component.

Three substantially coplanar tabs, each tabs having first and second opposing ends, are attached to the carrier or housing at the first end of each tab. The second end of each tab extends out from the carrier or housing in a direction substantially parallel to the resting surface when said system is placed on the resting surface. Three extruded, resilient feet, each having first and second opposing ends and a hole extruded through each of the feet are attached to a unique one of the tabs by sliding the feet over the tabs so that the tabs are inserted into the holes in each of the feet. The feet contact the resting surface when system is placed on the resting surface.

In another embodiment, the invention is a method for manufacturing and attaching shock absorbing feet to a carrier. The carrier has a plurality of tabs, wherein each of the tabs includes first and second opposing ends. The first end of each tab is attached to the carrier, and the second end of each tab extends out from the carrier. In a first step, a resilient, extrudable, elastomeric or polymeric material is provided. Next, the resilient material is extruded into an elongated shape having an interior hole extending in the direction of extrusion. This elongated shape is then cut into a plurality of individual feet, such that each foot has two opposing ends formed at the cutting plane. Finally, the feet are attached to the carrier by sliding one end of each foot over a unique one of the tabs, such that each tab is positioned in the interior hole of each foot when the feet are attached to the carrier.

DESCRIPTION OF THE ILLUSTRATIVE EMBODIMENT

Figure 1A:
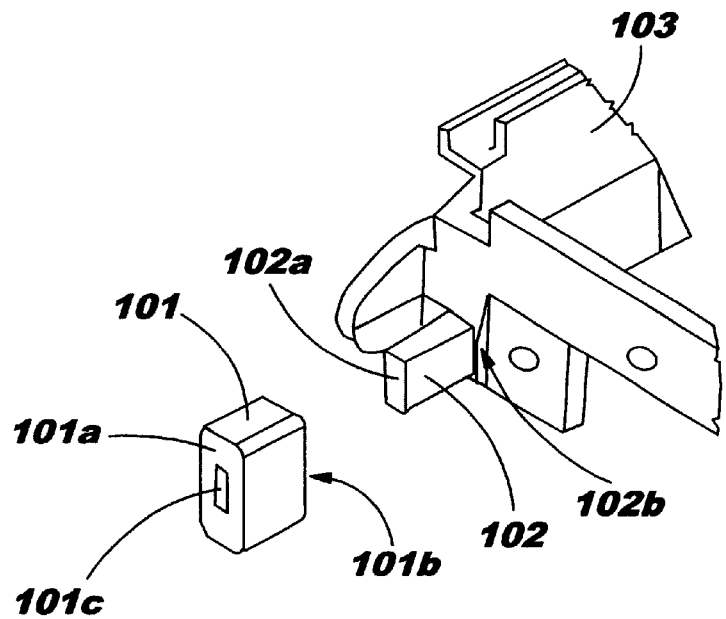
FIG. 1A is a detailed perspective view of one corner of a disk drive carrier (or other computer sub-system housing) having a mounting tab and an extruded, resilient foot of the present invention in which the foot is illustrated disassembled from the mounting tab .
Figure 1B:
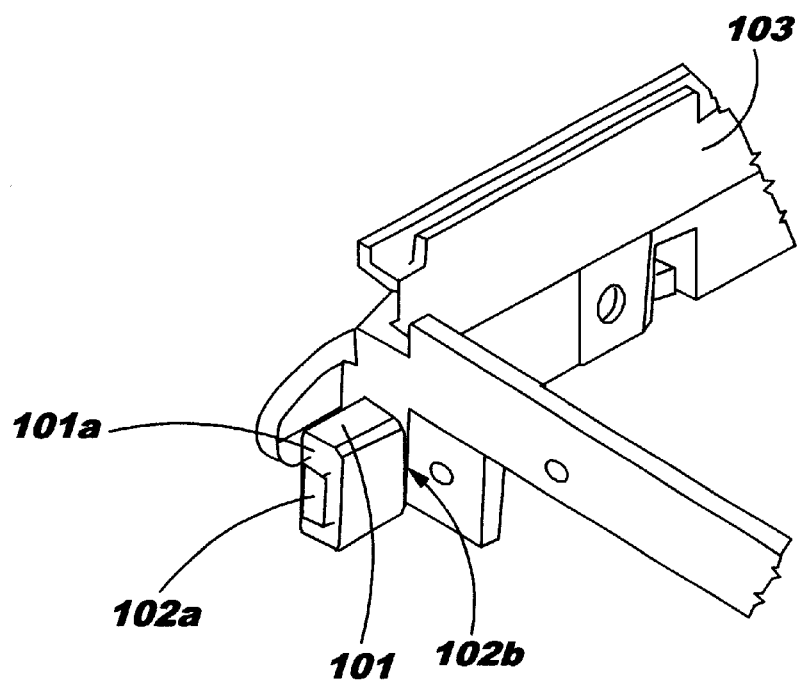
FIG. 1 B is similar to FIG. 1 B except that the foot is illustrated attached to the mounting tab.

FIGS. 1A and 1B are perspective views of an illustrative embodiment of the extruded shock absorbing foot and mounting tab of the present invention. Referring to these figures, foot 101 includes two opposing ends 101a and 101b (only the edge of end 101b is visible in the figures) and a hole 101c that extends through the foot from one end 101a to the other end 101b.

Foot 101 is manufactured using an extrusion process. The process starts with a resilient, extrudable, elastomeric or polymeric material, such as Santoprene™. Next, the material is extruded, using a well known extrusion process, into an elongated shape having an interior hole that extends in the direction of extrusion (i.e., in the direction of elongation). Next, the elongated shape is cut into sections by, for example, die cutting or sawing. Each of these cut sections is a individual foot that has two opposing ends, such as ends 101a and 101b, formed at the cutting plane.

Tab 102 includes two opposing ends 102a and 102b. Tab 102 is attached to a disk drive carrier or other computer sub-system housing 103 at end 102b. End 102a then projects out from the carrier or other computer sub-system housing 103 in a direction that is substantially parallel to the table or other resting surface, such as resting surface 205 of FIG. 2. Foot 101 is then attached to tab 102 by sliding the foot over the tab such that the tab is inserted into hole 101c.

Figure 2:
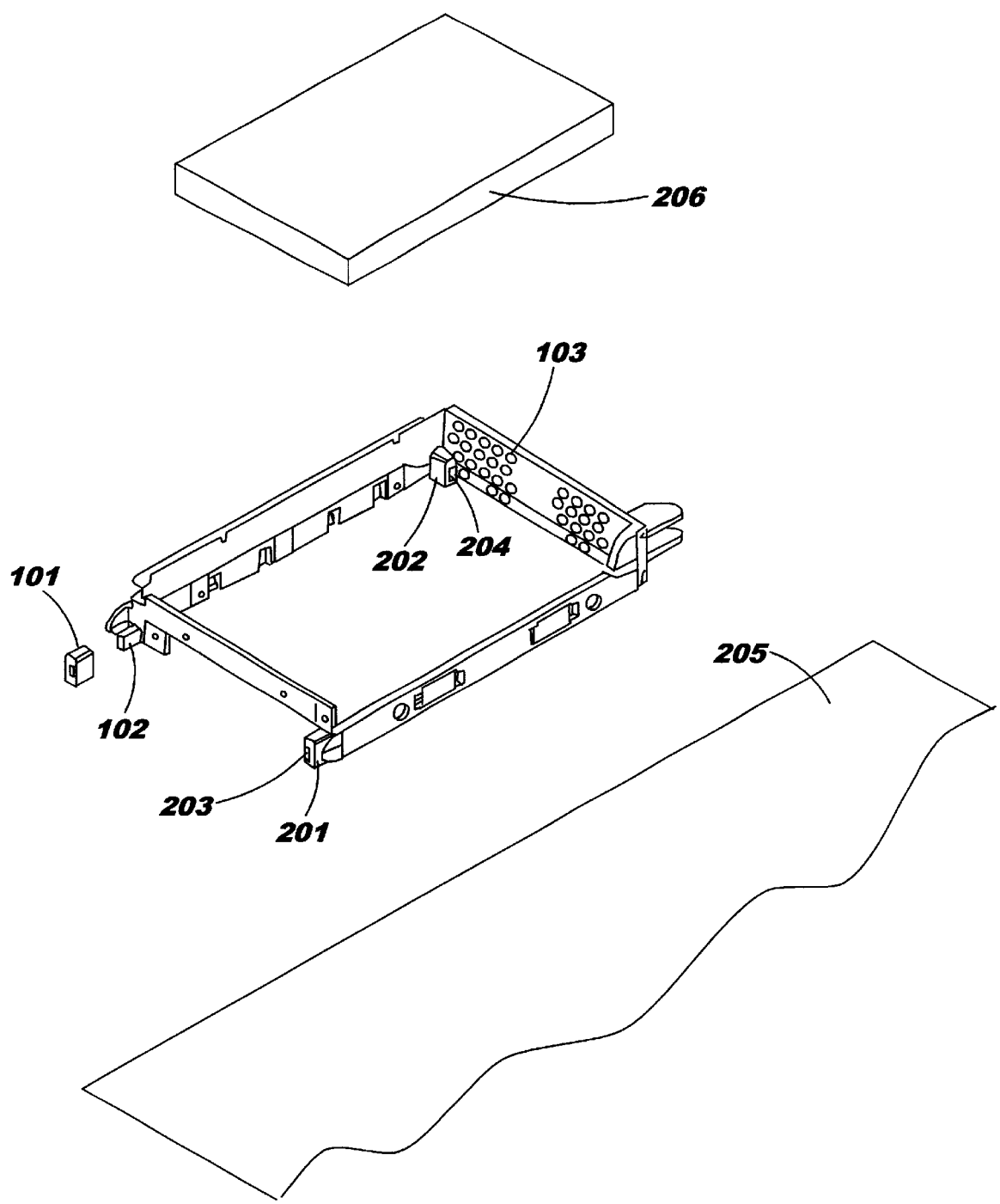
FIG. 2 is an exploded perspective view of a disk drive or other computer sub-system, a table top or other resting surface, and a carrier or housing including three mounting tabs and three extruded, resilient feet of the present invention.

FIG. 2 is a perspective view of a disk drive carrier or other computer sub-system housing including three of the extruded shock absorbing feet and mounting tabs of the present invention. Referring to this figure, carrier 103 is suitably shaped to support a well known disk drive 206 or other computer sub-system component. One end of each tab 102, 203 and 204 (only the free ends of tabs 203 and 204 are visible in FIG. 2) is attached to carrier 103 such that the opposite end of each tab extends out from the carrier in a direction substantially parallel to resting surface 205 when the carrier is placed on the resting surface. Feet 101, 201 and 202 are attached, respectively, to tabs 102,203 and 204 as described above. A fourth foot and tab are preferred and can be positioned in the inside, upper right corner of carrier 103 (this inside corner is obscured in FIG. 2).

When carrier 103 is placed on resting surface 205, feet 101, 201 and 202 (as well as the fourth foot mentioned above) contact the resting surface and deflect upward approximately 1 mm to absorb shock. This deflection dissipates the energy of the shock to less than 40 g's and a duration of 10 ms. According to hard disk drive manufacturer specifications, this takes the shock energy levels in handling to an extremely low risk range for inducing shock related damage to the hard disk drive.

We claim as our invention:

1. A disk drive system for placement on a resting surface, said disk drive system comprising:

a disk drive;

a carrier supporting said disk drive;

three substantially coplanar tabs, each of said tabs having first and second opposing ends, the first end of each tab being attached to said carrier, the second end of each tab extending out from said carrier in a direction substantially parallel to the resting surface when said disk drive system is placed on the resting surface; and three extruded, resilient feet, each of said feet having first and second opposing ends and a hole extruded through each of said feet from the first to the second end, each of said feet being attached to a unique one of said tabs by sliding said feet over said tabs so that said tabs are inserted into the holes in each of said feet, said feet contacting the resting surface when said disk drive system is placed on the resting surface.

2. A computer sub-system for placement on a resting surface, said sub-system comprising:

electronic components;

a housing supporting said electronic components;

three substantially coplanar tabs, each of said tabs having first and second opposing ends, the first end of each tab being attached to said housing, the second end of each tab extending out from said housing in a direction substantially parallel to the resting surface when said computer sub-system is placed on the resting surface; and three extruded, resilient feet, each of said feet having first and second opposing ends and a hole extruded through each of said feet from the first to the second end, each of said feet being attached to a unique one of said tabs by sliding said feet over said tabs so that said tabs are inserted into the holes in each of said feet, said feet contacting the resting surface when said computer sub-system is placed on the resting surface.

3. A method for manufacturing and attaching shock absorbing feet to a carrier having a plurality of tabs, wherein each of the tabs includes first and second opposing ends, the first end of each tab being attached to the carrier, the second end of each tab extending out from the carrier, said method comprising the steps of:

providing a resilient, extrudable, elastomeric or polymeric material;

extruding said resilient material into an elongated shape having an interior hole extending in the direction of extrusion;

cutting the elongated shape into a plurality of individual feet, such that each foot has two opposing ends formed at the cutting plane;

attaching the feet to the carrier by sliding one end of each foot over a unique one of the tabs, such that each tab is positioned in the interior hole of foot when the feet are attached to the carrier.

* * * * *